United States Patent [19]

Adams

[11] Patent Number: 5,001,357
[45] Date of Patent: Mar. 19, 1991

[54] LINEAR GRAVITATIONAL GENERATOR

[76] Inventor: Nelson P. Adams, 1 Center St., Municipal Bldg., Rm. 800, New York, N.Y. 10007

[21] Appl. No.: 330,075

[22] Filed: Mar. 29, 1989

[51] Int. Cl.$^5$ .............................................. F03B 9/00
[52] U.S. Cl. ...................................... 290/1 R; 290/54
[58] Field of Search ................ 290/1 R, 1 C, 1 D, 43, 290/54; 415/2.1, 5; 310/12, 14

[56] References Cited

U.S. PATENT DOCUMENTS

| | | | |
|---|---|---|---|
| 2,104,984 | 1/1938 | Grondahl | 415/5 |
| 3,273,001 | 9/1966 | Baermann | 290/1 R |
| 4,242,868 | 1/1981 | Smith | 415/5 X |
| 4,468,568 | 8/1984 | Carr, Jr. et al. | 290/1 R |
| 4,803,387 | 2/1989 | Seider | 310/12 |

Primary Examiner—A. D. Pellinen
Assistant Examiner—W. E. Duncanson, Jr.

[57] ABSTRACT

This linear gravitational generator is designed to produce electric current by induction. Primarily, it consists of a pair of coils wound upon cores, and an external drive source drives a pulley train that passes a multiple number of spaced magnetic buckets through the coils on a pair of cables of the pulley train, which induces electric current into the coils for industrial use and other applications.

4 Claims, 2 Drawing Sheets

LINEAR GRAVITATIONAL GENERATOR

BACKGROUND OF THE INVENTION

The instant invention relates generally to electrical generators, and more particularly, to a linear gravitational generator.

Numerous electrical generators have been provided in the prior art that are adapted to produce electricity. While these units may be suitable for the particular purpose to which they address, they would not be as suitable for the purpose of the present invention as hereafter described.

SUMMARY OF THE INVENTION

A primary object of the present invention is to provide a linear gravitational generator that will overcome the shortcomings of the prior art devices.

Another object is to provide a linear gravitational generator that will employ magnetic buckets that cut lines of force as in aircraft magnetos.

An additional object is to provide a linear gravitational generator that will induce current into coils while being highly efficient.

A further object is to provide a linear gravitational generator that is simple and easy to use.

A still further object is to provide a linear gravitational generator that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
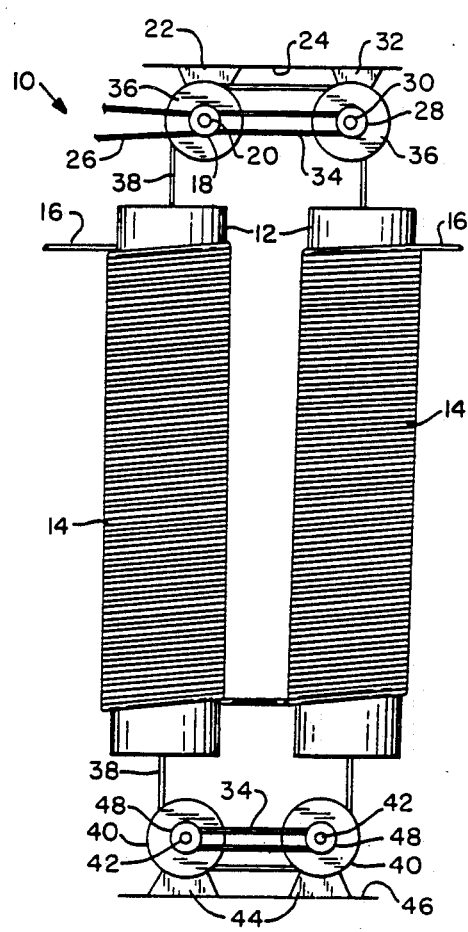
FIG. 1 is a diagrammatic side elevational view of the instant invention.
Figure 2:
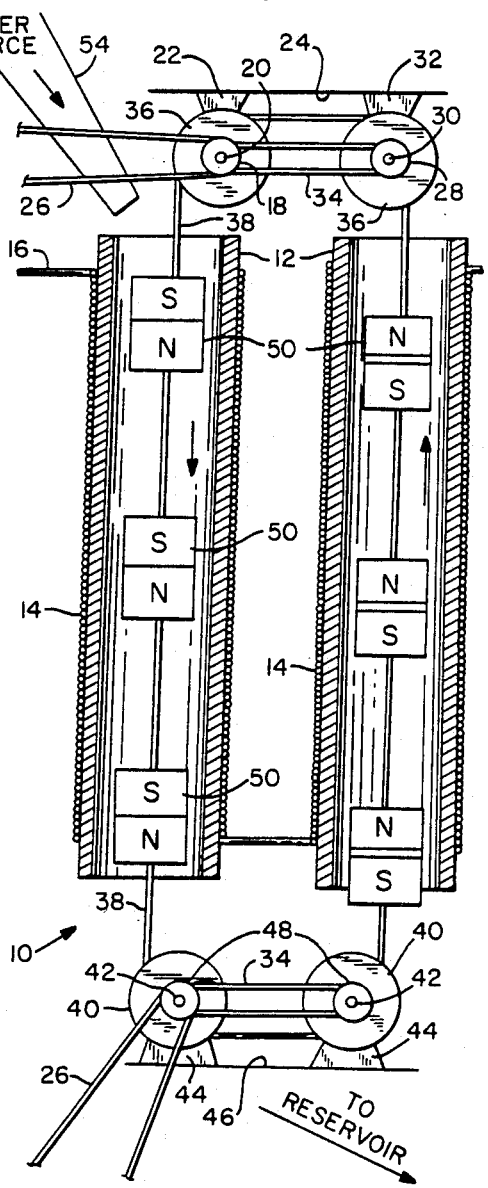
FIG. 2 is a similar diagrammatic view thereof, shown in cross-section to illustrate the path of the magnetic buckets inside the copper coils of the ballast.
Figure 3:
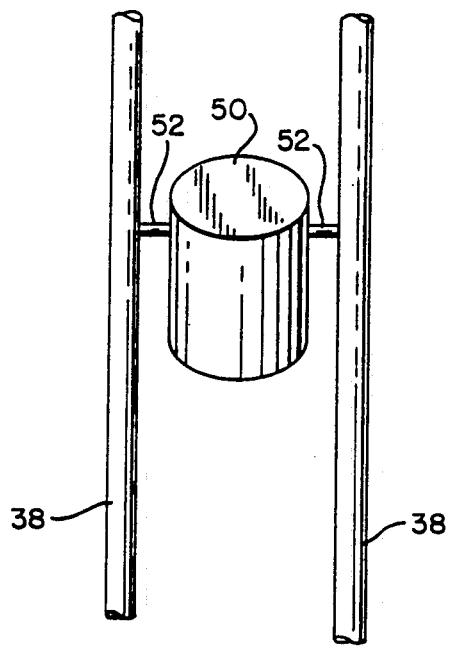
FIG. 3 is an enlarged diagrammatic perspective view illustrating the mounting of a magnet.
Figure 4:
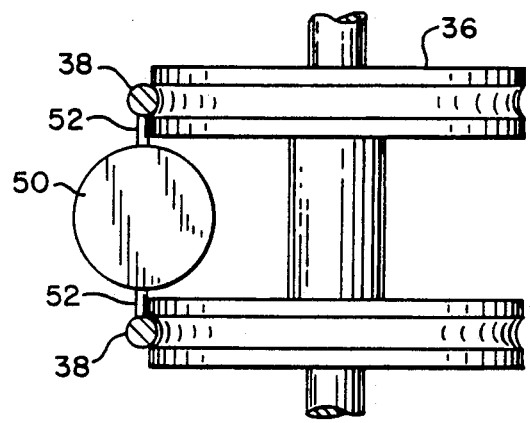
FIG. 4 is a fragmentary diagrammatic top plan view of the pulley arrangement that carries the magnetic buckets.

Turning now descriptively to the drawings, in which like reference characters denote like elements throughout the several views, a generator 10 is shown to include a pair of spaced vertical sleeve cores 12 having copper wire coils 14 wound thereon and connected in series, and being mounted in a suitable manner (not shown). The ends 16 of coils 14 are secured (in a manner not shown) to any industrial or other application source that will use the electrical power produced by generator 10.

A double pulley 18 is secured to a shaft 20 mounted in a pillow block 22 secured to an upper surface 24, and a drive belt 26 is received on one side of double pulley 18 and is also received on a pulley of an auxiliary generator (not shown), for supplying the mechanical energy thereto.

Another pulley 28 is provided and secured to a shaft 30 mounted in a pillow block 32 secured to surface 24, and an endless belt 34 is received on the other side of double pulley 18 and is received on pulley 28, so as to simultaneously drive pulley 28 by the mechanical energy source.

A pair of large double pulleys 36 are secured to shafts 20 and 30 and carry a pair of endless cables 38 that are freely received in the sleeve cores 12 and are carried on a second pair of large double pulleys 40. The second pair of large double pulleys 40 are secured to shafts 42 mounted in pillow blocks 44 secured to a lower surface 46, and pulleys 48 secured also to shafts 42, carry a second endless belt 34 driven by a second belt 26 of the drive source motor/generator.

A plurality of equally spaced permanent magnetic buckets 50 are provided and are fixedly secured longitudinally to cables 38 by pins 52 fixedly secured to an end portion of magnetic buckets 50, and magnetic buckets 50 are all orientated in the same polarity directions, as indicated by the letter characters (N) and (S), meaning north and south magnetically.

A water drive chute 54 is positioned above one core 12, for directing water into the bore of the core 12 to provide mechanical energy to the system as well as cooling, because of the heat generated by the magnetic buckets 50 during the electro-magnetic induction taking place when generator 10 is operating.

In operation, the pulleys 18 and 28 when driven by the falling weight of the water causes the magnetic buckets 50 to pass down through the first coil 14 and up through the second coil 14 and induces electric current into the coils 14, which is taken off at the ends 16 thereof.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A linear gravitational generator for producing electrical current, a pair of spaced wire coils in which said electrical current is to be induced secured in said generator, a pulley train secured in said generator, providing for travel and passage of a plurality of permanent magnetic buckets through said pair of spaced wire coils, a pair of cables driven by said pulley train and fastened to said magnetic buckets and mechanical drive source means for driving said pulley train thereby causing the permanent magnetic buckets to travel through the coils.

2. A linear gravitational generator as set forth in claim 1, wherein said pair of spaced wire coils are vertical mounted in said generator and wound upon cores, and said wire coils are wound in series with each other and ends of said coils provide for connecting to any work-load desired, and said pulley train is secured to an upper surface and a lower surface of said generator by pillow block means.

3. A linear gravitational generator as set forth in claim 2, wherein said mechanical drive source means causes said magnetic buckets to descend down a bore of one coil and up a bore of a second coil of said pair of spaced wire coils, and each magnet of said permanent magnetic buckets is orientated in the same direction, a north pole adjacently spaced from a south pole of a next said magnet.

4. A linear gravitational generator as set forth in claim 3, wherein said pair of cables are endless and are received in groove means of a plurality of double pulleys secured to shafts of said pulley train, and a pair of pins are fixedly secured to and between each cable of said pair of cables and are fixedly secured to outer peripheries of said plurality of permanent magnetic buckets, and said pins carry said magnetic buckets around said plurality of double pulleys of said pulley train, and a water chute secured in said generator, directs water into a coil bore and cools said generator.

* * * * *